United States Patent [19]

Muroi et al.

[11] 4,305,981
[45] Dec. 15, 1981

[54] ELASTIC METALLIZED DECORATIVE MOLDINGS

[75] Inventors: Ryoichi Muroi, Aichi; Toshiyasu Ito, Kasugai; Takao Nomura, Toyota; Tsugumi Sanmiya, Toyota; Yasuhiro Mishima, Toyota; Yoshiro Umemoto, Nagoya, all of Japan

[73] Assignee: Toyoda Synthetics Co., Ltd., Aichi, Japan

[21] Appl. No.: 129,695

[22] Filed: Mar. 12, 1980

[30] Foreign Application Priority Data

Mar. 12, 1979 [JP] Japan .............................. 54-30476[U]

[51] Int. Cl.³ ...................... B60R 13/02; B32B 27/40
[52] U.S. Cl. ..................................... 428/31; 293/120; 428/421; 428/424.2; 428/424.6; 428/425.8; 428/462; 428/463; 428/518; 428/519; 428/520; 428/521
[58] Field of Search ...................... 428/425.8, 31, 462, 428/463, 421, 518, 519, 520, 521, 424.2, 424.6; 525/130; 293/120

[56] References Cited

U.S. PATENT DOCUMENTS

| 3,431,227 | 4/1969 | Kastning | 525/130 |
| 3,669,719 | 6/1972 | Doede | 428/462 |
| 3,771,973 | 11/1973 | Miller | 428/425.8 |
| 3,978,157 | 8/1976 | Bottenbruch | 525/130 |
| 4,052,522 | 10/1977 | Narita | 428/31 |

Primary Examiner—Ellis P. Robinson
Attorney, Agent, or Firm—Birch, Stewart, Kolasch and Birch

[57] ABSTRACT

Elastic metallized decorative moldings are disclosed composed of a modified polyurethane resin as a substrate coated on the surface thereof with a metallized layer, the polyurethane resin comprising 50–95 parts by weight of a thermoplastic polyurethane resin incorporated with 5–50 parts by weight of an acrylonitrile-butadiene-styrene resin comprised of at least 75% by weight of an acrylonitrile-styrene component and not more than 25% by weight of a butadiene component. Such elastic metallized decorative moldings are useful as impact-absorbing materials with beautiful appearance for various structures, especially as bumper moldings for motor vehicles.

17 Claims, 3 Drawing Figures

ELASTIC METALLIZED DECORATIVE MOLDINGS

BACKGROUND OF THE INVENTION

The present invention relates to elastic metallized decorative moldings composed of a modified polyurethane resin as a substrate coated on the surface thereof with a metallized layer. More particularly, the present invention relates to elastic metallized decorative molded articles useful as impact-absorbing materials in which a metallized layer is coated on the surface of an elastic substrate composed of a specific plastic polyurethane resin modified with an AS or ABS resin in a specific proportion.

In recent years, elastic decorative moldings made of an elastic synthetic resin have been mounted in place of rubber moldings on bumpers and side exterior walls of motor vehicles for the purpose of not only protecting the motor vehicles from damage caused by external impact but also improving aesthetic value in appearance. Accordingly, resinous materials for such elastic decorative resin moldings are naturally required to be excellent in impact-resistance, self-redintegration in shape and size, strength, abrasion resistance and the like properties. As motor vehicles are exposed under severe weathering conditions, the resinous materials are also required, as a matter of course, to be satisfactory in heat-resistance and cold-resistance. From the economical point of view, the resinous materials are further required to be suited for processing by injection molding or extrusion molding operations generally adopted as advantageous means for mass production.

Hitherto used elastic decorative moldings having metallic appearance for motor vehicles are (A) soft polyvinyl chloride moldings provided on the surface thereof with a multi-layer film of polyvinyl fluoride (top protective layer)-aluminum vapor deposited on polyethylene terephthalate (metallized layer)-polyvinyl chloride (undercoat layer) or with a thin layer of stainless steel by the aid of a binder or (B) vulcanized rubber moldings provided on the surface thereof with a thin metal layer by vacuum deposition. However, these prior art products have many drawbacks in practical use. In case of the product (A), disfigurement tends to remain on the surface when the product is significantly deformed, and moreover, either of cold-resistance and heat-resistance of the substrate becomes poor according to the proportion of a plasticizer incorporated into the polyvinyl chloride substrate. In case of the product (B), vacuum deposition of a metal is disturbed considerably by evaporation of processing oils, plasticizers and the like ingredients incorporated into the vulcanized rubber substrate so that the luster of the metal deposited is lost or adhesiveness of the metal film to the substrate becomes extremely poor. For overcoming these drawbacks, an improved process is proposed wherein melamine, alkyd resin or the like paint is applied onto the surface of the rubber substrate to form a migration-preventing layer by which evaporation of ingredients incorporated into the substrate is prevented. However, the products obtained according to this improved process still have shortcomings, in that the metal film is cracked or delaminated on deformation of the products because of poor adhesiveness between the substrate and the migration-preventing layer or poor flexibility of the migration-preventing layer. Thus, polyvinyl chloride, natural and synthetic rubbers are found to be unsatisfactory as the substrate for elastic decorative moldings for motor vehicles.

On the other hand, other elastic resins such as polyurethane alone or as a mixture with ABS or AS resin come into question as the elastic substrate. However, known compositions comprised of polyurethane and ABS or AS resin disclosed in Japanese Patent Publn. Nos. 19492/61 and 659/71 are also found to be unsatisfactory as the substrate for elastic decorative moldings for automobiles since these compositions are extremely poor in at least one of the several severe conditions as required for motor vehicles. Thus, an important key to overcoming the drawbacks of the prior art elastic decorative moldings is to use a special resinous material as substrate which can satisfy all of the above mentioned necessary physical properties. Hence, there is a great demand for development of a new resinous material which satisfies the severe conditions as required for motor vehicles when it is used as substrate for elastic decorative moldings.

BRIEF SUMMARY OF THE INVENTION

Accordingly, it is an object of the present invention to provide elastic metallized decorative moldings which overcome the drawbacks above mentioned.

It is another object of the present invention to provide elastic metallized decorative bumper moldings for motor vehicles.

It is still another object of the present invention to provide the use of a new modified thermoplastic polyurethane resin as substrate for elastic metallized decorative moldings.

Other and further objects, features and advantages of the present invention will become apparent more fully from the following description.

DETAILED DESCRIPTION OF THE INVENTION

As a result of extensive research made on elastic resins as substrates and on methods for furnishing the substrates with durable metallic luster for overcoming the drawbacks of the known elastic metallized decorative moldings, it has now been found that new improved elastic metallic decorative moldings which are excellent in both heat-resistance and cold-resistance and are restorable to the original shape and size without retaining any damage even when significantly deformed can be obtained by using a specific thermoplastic polyurethane resin as substrate and processing the surface thereof with a metallized layer or a metal-containing paint. The present invention has been accomplished on the basis of the above finding.

In accordance with the present invention, there are provided elastic metallized decorative moldings composed of a modified polyurethane resin as a substrate coated on the surface thereof with a metallized layer, the polyurethane resin comprising 50–95 parts by weight of a thermoplastic polyurethane resin incorporated with 5–50 parts by weight of an acrylonitrile-butadiene-styrene resin comprised of at least 75% by weight of an acrylonitrile-styrene component and not more than 25% by weight of a butadiene component.

In the elastic metallized decorative moldings of the present invention, the thermoplastic polyurethane resin is derived from (a) poly(pentamethylenecarbonyloxy) glycol having an average molecular weight of about 1800–2200 or (a') polytetramethylene adipate glycol, (b)

tetramethylene glycol in an amount of 2.5–4.5 mols per mol of the ingredient (a) or (a'), and (c) diphenylmethane-4,4'-diisocyanate in a molar amount corresponding to the total mols of the ingredients (a) or (a') and (b) used. The ingredient (a), poly(pentamethylenecarbonyloxy) glycol, can be prepared by decyclic polycondensation of ε-caprolactone, while the ingredient (a'), polytetramethylene adipate glycol, can be prepared by esterification of tetramethylene glycol with adipic acid. The preparation of these ingredients (a) and (a') can be carried out according to a usual method known per se. The thermoplastic polyurethane can be synthetized by reacting given amounts of these ingredients (a) or (a'), (b) and (c) together according to a usual method well known in the art of preparing polyurethanes. The use of a thermoplastic polyurethane resin derived from polytetramethylene adipate glycol, tetramethyleneglycol (butane-1,4-diol) and diphenylmethane-4,4'-diisocyanate, i.e. the ingredients (a'), (b) and (c) is preferable in the present invention.

The acrylonitrile-butadiene-styrene resin to be incorporated as modifier into the thermoplastic polyurethane resin to prepare the modified polyurethane resin is composed of at least 75% by weight of an acrylonitrile-styrene component and not more than 25% by weight of a butadiene component and is generally called "ABS resin" or "AS resin" (in case the content of the acrylonitrile-styrene component is 100% or in other words the content of the butadiene component is 0%). The acrylonitrile-butadiene-styrene resin preferably has a molecular weight within the range from 50,000 to 150,000 and a composition of 10–30 wt.% acrylonitrile, 45–90 wt.% styrene and 0–25 wt.% butadiene and is easily commercially available or can be prepared in a manner known per se.

The modified polyurethane resin used in the present invention as substrate can easily be manufactured by incorporating the thermoplastic polyurethane resin with the acrylonitrile-butadiene-styrene resin, for example, by mixing given amounts of these ingredients in powdery or pelletized form, e.g. in an ordinary mixer and then melting and kneading the mixture at 180°–220° C. by the aid of mixing rolls, a mixing extruder or an internal mixer.

In the present invention, the proportion of the modified polyurethane resin to the acrylonitrile-butadiene-styrene resin is limited within the range from 95:5 to 50:50 on weight basis so as to furnish the substrate with desired physical properties. If the proportion of the modified polyurethane resin exceeds 95:5, the heat-resistance of the substrate will be reduced so that the substrate will incur sagging on molding at high temperatures by extrusion or injection and will be susceptible to deformation at a high temperature. On the other hand, if the proportion of the modified polyurethane resin is less than 50:50, the substrate will become rigid and brittle so that it will be cracked when deformed and its cold-resistance, weather resistance and restorability to the original shape and size will seriously be reduced. A preferable proportion of the modified polyurethane resin to the acrylonitrile-butadiene-styrene resin is within the range from 80:20 to 60:40.

According to the present invention, the modified polyurethane resin is molded into a desired shape, e.g. a bumper molding, by injection or extrusion through a complicately figured extrusion die. The injection molding or extrusion molding in this case is performed according to well known methods. A substrate having a composite structure is thus manufactured from the modified polyurethane resin.

The substrate thus obtained is then subjected to a metallizing treatment to apply a thin layer of a metal or an alloy or of a metal-containing paint onto the surface of the substrate. No limitation is set for the sort of metals and alloys to be used for the metallizing treatment but aluminum, stainless steel, Ni-Cr, copper, copper alloys, and the like are preferably used. The metallizing treatment of the substrate is carried out by a variety of known conventional methods, for example, by applying a metal-containing paint or by means of vacuum deposition, ion-plating, spattering, hot-stamping, electroplating or spray-plating, among which vacuum deposition, spattering, ion-plating and application of a metal-containing paint are preferable. In view of similarity in mechanism, "spattering" and "ion plating" are often involved in the term "vacuum deposition" in a broader sense of the meaning. Accordingly, the term "vacuum deposition" is used herein to generally mean "spattering" or "ion plating" in addition to the inherent meaning of "vacuum deposition". A thin film of a metal, an alloy or a metal-containing paint (sometimes called "metallic paint") thus formed on the substrate is usually overcoated with a top protective film which has generally strong weather-resistance. As a rule, polyvinyl fluoride is suited as a material for such protective film.

According to an alternative preferred method for matallizing treatment, the substrate is overlaid with a multi-layer film composed of polyvinyl fluoride or chloride top coat/a metal vacuum deposited polyethylene terephthalate intermediate coat/a vinylic resin under coat. In this case, there is no necessity of further providing a protective film on the multi-layer film.

The structure of the elastic metallized decorative moldings of the present invention will be explained in more detail hereunder in the light of the accompanying drawings in which.

Figure 1:
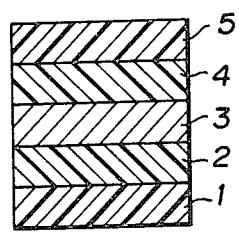
FIG. 1 is a diagram schematically showing the section of the surface of one example of the elastic metallized decorative moldings of the present invention.

In FIG. 1 is schematically shown the section of the metallized layer of the decorative molding obtained by applying a multi-layer film onto the surface of the substrate. The substrate 1 is overlaid with a multi-layer film composed of a vinylic resin film 2, vacuum deposited aluminum film 3, polyethylene terephthalate film 4 and polyvinyl fluoride or transparent soft polyvinyl chloride 5 in such a manner that the surface of the substrate 1 is faced to the surface of the vinylic resin film 2.

Figure 2:
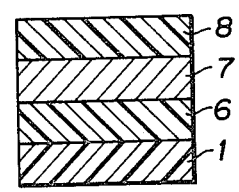
FIG. 2 is a diagram schematically showing the section of the surface of another example of the elastic metallized decorative moldings of the present invention.

In FIG. 2 is schematically shown the section of the metallized layer of the decorative molding obtained by applying a thin metal film by means of vacuum deposition in a broader sense involving spattering. The substrate 1 is coated with a base coat 6, a thin metal film 7 and a top coat 8 successively in the prescribed order. In case a metallic paint is used for the metallizing treatment, the above metal film 7 is replaced by the metallic paint film. The base coat 6 and the top coat 8 are preferably applied in the same manner as in FIG. 1 but these coats 6 and 8 may be omitted, if desired. The term "metallized layer" is used herein to mean generally the thin metal film or the thin metallic paint film alone or in combination with the other films such as the base coat film and the top coat film.

The elastic metallized decorative moldings of the present invention are not only excellent in cold resistance, heat resistance, flexibility and restorability to the original shape and size without any disfigurement even when deformed significantly but also advantageous in that the decorative moldings can easily be manufactured by extrusion molding or injection molding in contrast to the case of known thermoplastic polyurethane resins which can hardly be processed by extrusion molding or injection molding. In the products obtained by applying a multi-layer film onto the substrate, the surface of the film is substantially free from disfigurement even in case of deformation and the adhesiveness between the substrate and the multi-layer is extremely good, because the substrate is excellent not only in cold resistance and heat resistance but also in combination of hardness and elongation and because adhesiveness between the substrate and the vinylic resin is excellent. In the products obtained by means of vacuum deposition or spattering, the products have brilliant metallic luster of transparent feeling in addition to the above mentioned excellent physicochemical properties, since no substance evaporates under vacuum. In the products obtained by application of a metallic paint such as one having metallic silver tint, adhesiveness between the paint film and the substrate is excellent in addition to the remarkable merits above mentioned.

As the elastic metallized decorative moldings of the present invention have strong resistance to various corrosive attacks such as weathering and chemical actions, the moldings are hardly susceptable to "whitening" generally caused by degradation of the resinous materials and oxidation of the metal applied so that the metal film itself or metal paint film can keep its brilliant luster for a prolonged period of time.

The present invention is especially valuable in making it possible to provide for the first time practically attractive elastic moldings with durable metallic luster. Accordingly, the moldings of the present invention are particularly suited as parts of motor vehicles and similar transporting vehicles, such as bumper moldings, side moldings, step moldings, lamp moldings and luggage moldings. Besides this, the moldings of the present invention find various applications, for example, indoor and outdoor ornaments, buffer materials, shock-absorbers, sporting goods and parts of machines, such as slip-preventing strips, belts, packings, protecting guard, soles of shoes, and the like. The moldings of the present invention can be mounted or fixed to objects by the aid of a binder, a dual-adhesive tape, clips or bolts and nuts or by means of insertion.

The present invention will now be illustrated in more detail by way of the following examples.

EXAMPLE 1

A mixture of 30 parts by weight of ABS resin composed of 15% by weight of a butadiene component and 85% by weight of an acrylonitrile-styrene component and 70 parts by weight of a thermoplastic polyurethane resin derived from polytetramethylene adipate glycol having a hydroxyl number of 37.0, an acid number of 0.4 and a molecular weight of about 3000, 1,4-butanediol and diphenylmethane-4,4'-diisocyanate was prepared to form a modified polyurethane resin. Table 1 shows physical characteristics of this modified polyurethane resin.

TABLE 1

| | |
|---|---|
| Tensile strength (kg/cm$^2$) | 590 |
| Fracture elongation (%) | 500 |
| 100% Modulus (kg/cm$^2$) | 130 |
| Tear strength (kg/cm) | 145 |
| Cold embrittlement temperature* (°C.) | $<-70$ |
| JIS Hardness (A) | 96 |

*The test for measuring the cold embrittlement temperature was carried out according to JIS K-6723. The testing methods for measuring the other characteristics were carried out according to JIS K-6301.

Figure 3:
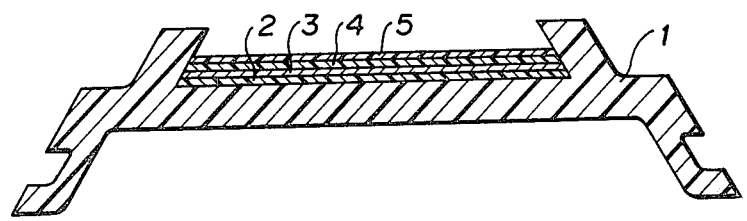
FIG. 3 is a schematic sectional view of a bumper molding as one embodiment of the present invention.

This modified polyurethane resin was molded by extrusion into a bumper molding having a section as shown in FIG. 3. A multi-layer film containing a metallized film was thermally welded on the surface of the bumper molding. The resultant bumper molding was fixed onto the surface of a RIM (reaction injection molding) polyurethane bumper. The following tests were performed for test samples of the resulting product.

[Test Conditions and Evaluation Standards]

(1) Impact Test (i) Front Impact with a pole*:
The front surface of the test sample (the bumper onto which the bumper molding having the metallized layer had been fixed was struck two times each with a pole* moving lengthwise at a speed of 8 km/hr.

*A pole with a semispherical tip having a radius of 150 mm on one hand having an appearance of a long-stem mushroom was used in this impact test in such manner that the front surface of the test sample (the RIM polyurethane bumper having on the surface thereof the bumper molding) was struck two times each with the semispherically round tip of the pole moving lengthwise at a speed of 8 km/hr.

(ii) Corner impact with a flat panel:
A corner of the test sample was struck once at an angle of 30° with a flat panel at a speed of 5 km/hr.

Considerable deformation or formation of cracks should not be observed in the sample test under the above conditions.

(2) High Temperature Oscillation Test

| | |
|---|---|
| Temperature | 80° C. |
| Frequency | 1500 cs/min |
| Oscilatory acceleration | 3.5 G |
| Total number of oscilation | 1,000,000 |

Imperfections in appearance such as serious waving and deformation should not be observed in the sample tested under the above conditions.

(3) Heat Cycle Test

| Temp. (°C.) | 80 | ord* | −30 | ord | 50** | ord | −30 | ord |
|---|---|---|---|---|---|---|---|---|
| Time (hr) | 15.5 | 0.5 | 7.5 | 0.5 | 15.5 | 0.5 | 7.5 | 0.5 |

*"ord" means ordinary (ambient) temperature.
**tested in a high humidity of 98%

Imperfactions in appearance such as deformation, discoloration or fading*** should not be observed in the sample after repeating the test 5 times under the above conditions.

***Discoloration or fading in this case means all of the phenomena wherein the metallic luster becomes cloudy or is decreased or lost, the tint of the metallic paint is discolored or faded, and the color of the resinous layers is changed or faded.

(4) Water Immersion Test

Immersion of the test sample in warm water maintained at 40° C. for 240 hours.

Considerable discoloration or fading and delamination of the film should not be observed in the sample tested under the above conditions.

(5) Salt Spray Test

Immersion of the test sample in a 5 wt.% NaCl solution maintained at 35° C. for 240 hours after thermal aging of the sample at 90° C. for 100 hours.

Rust should not be observed in the sample tested under the above conditions.

(6) Abrasion Test

A reciprocally moving (2000 cycles) sailcloth was used as an abrasive surface under a load of 500 g (Ford test).

Streaks or abrasion should not be significant in the sample tested under the above conditions.

(7) Accelerated Weather-resistance Test

The test sample was subjected to accelerated degradation in a sunshine weather-o-meter for 400 hours.

Considerable discoloration or whitening* should not be observed in the sample tested under the above conditions.

*"whitening" is caused by both degradation of the resinous materials and oxidation of the metal.

A result of these tests is shown in Table 2.

TABLE 2

| Test item | | Result obtained |
|---|---|---|
| Front impact | 55° C. | O |
| | ordinary temperature | O |
| | −30° C. | O |
| Corner impact | 55° C. | O |
| | ordinary temperature | O |
| | −30° C. | O |
| High temperature oscilation test | | O |
| Heat cycle test | | O |
| Water immersion test | | O |
| Salt spray test | | O |
| Accelerated weather-resistance test | | O |
| Abrasion test | | O |

*Circle (O) means passing the test.

EXAMPLE 2

A modified thermoplastic polyurethane resin was prepared from 20 parts by weight of an acrylonitrile-styrene resin composed of 24% by weight of an acrylonitrile component and 76% by weight of a styrene component and 80 parts by weight of the thermoplastic polyurethane resin used in Example 1. Table 3 shows physical characteristics of this modified thermoplastic polyurethane resin.

TABLE 3

| | |
|---|---|
| Tensile strength (kg/cm²) | 570 |
| Fracture elongation (%) | 520 |
| 100% Modulus (kg/cm²) | 115 |
| Tear strength (kg/cm) | 147 |
| Cold embrittlement temperature (°C.) | <−70 |
| JIS Hardness (A) | 96 |

The testing methods for measuring the physical characteristics were identical with those described in Example 1.

The modified polyurethane resin was subjected to extrusion molding to obtain a bumper molding of the same size as described in Example 1. A two component polyurethane paint was applied onto the surface of the bumper molding by means of spray coating to form a paint film having a thickness of about 10μ. The coated bumper molding was subjected to a compulsory drying treatment conducted at 80° C. for 1.5 hours. A Ni-Cr alloy was then applied by the aid of a spattering device of DC magnetron type [Model CFS-24PV-120B, Tokuda Seisakusho (Tokuda Mfg. Co.), Japan] onto the surface of the bumper molding to form thereon a film of the alloy having a thickness of about 250 Å. The metallic film was further coated with a non-yellowing two-component polyurethane paint as a protective top coat. The product thus obtained exhibited excellent physical characteristics in comparison with an ordinary metal-deposited bumper molding made of rubber, as will be evident from Table 4. The bumper molding was fixed onto the surface of a RIM polyurethane bumper to form a product Test samples of the product were subjected to the same test as referred to in Example 1 whereby the test samples exhibited excellent properties for elastic metallized decorative molded articles. A result of the test is shown in Table 5.

TABLE 4

| Test item | Test condition | Product of this invention | Metal-deposited rubber molding |
|---|---|---|---|
| Metal luster | observation with naked eyes | Good | Cloudy for opacified) |
| Adhesiveness | cross-cut adhesion test | no lamination (100/100) | Partially delaminated (70/100) |
| Flexibility | 15 mm Φ | no crack | Cracks formed |
| Warm water resistance | 40° C., 400 hrs | no change | Delaminated |
| Heat resistance | 80° C., 400 hrs | " | " |
| Humidity and heat resistance | 50° C., 95% RH, 400 hrs | " | " |
| Abrasion test | Tabor, 1000 r. | " | Substrate exposed |
| Cold flexibility | −20° C., 15 mm Φ | " | Cracks formed |

TABLE 4-continued

| Test item | Test condition | Product of this invention | Metal-deposited rubber molding |
|---|---|---|---|
| Cold impact resistance | −20° C., 30 kg . cm | " | " |

(Remarks)
(1) Test for abrasion resistance: A sample was subjected to a rotary rubbing action of a taber abraser defined in ASTM D-1175 (Tests for abrasion of textile fabrics) in which an abrasive wheel CS #10 is used under a load of 500 g, to measure the number of revolutions required to give exposure of the substrate by wearing out the brilliant surface of the metal film.
(2) Test for cold impact resistance: The sample was allowed to stand for at least 2 hours at −20° C., then quickly placed on a supporting table of a DuPont's impact tester and subjected to a hammering action of a shaft with a semispherical tip having a radius of ¼ inch on one end therof which action was produced when a load of 500 g was dropped on the other end of the shaft. Any change in appearance of the sample in this case was observed and recorded.
(3) Warm water resistance, heat resistance and humidity and heat resistance: After these tests, observation of appearance of the tested sample as well as an adhesion test with a taping was made.

TABLE 5

| Test item | | Result obtained |
|---|---|---|
| Front impact | 55° C. | O |
| | ordinary temperature | O |
| | −30° C. | O |
| Corner impact | 55° C. | O |
| | ordinary temperature | O |
| | −30° C. | O |
| High temperature oscilation test | | O |
| Heat cycle test | | O |
| Water immersion test | | O |
| Salt spray test | | O |
| Accelerated weather-resistance test | | O |
| Abrasion test | | O |

*Circle (O) means passing the test.

EXAMPLE 3

A mixture of (1) 40 parts by weight of ABS resin composed of 15% by weight of a butadiene component and 85% by weight of an acrylonitrile-styrene component and (2) 60 parts by weight of a thermoplastic polyurethane resin derived from polytetramethylene adipate glycol having a molecular weight of about 2000, tetramethylene glycol and diphenylmethane-4,4'-diisocyanate was prepared. A modified polyurethane resin thus obtained possesses physical characteristics shown in Table 6. Using this modified polyurethane resin in the same manner as described in Example 1, a bumper molding was molded and a multilayer film was heat welded onto the surface of the bumper molding. The resultant bumper molding was then fixed to a RIM polyurethane bumper in the same manner as described in Example 1 to form a product. Table 7 shows a result of various tests made in the same manner as described in Example 1 for evaluating the performance of the product. As is evident from Table 7, this product exhibits excellent properties useful for elastic metallized decorative moldings.

TABLE 6

| Tensile strength (kg/cm$^2$) | 600 |
|---|---|
| Fracture elongation (%) | 500 |
| 100% Modulus (kg/cm$^2$) | 152 |
| Tear strength (kg/cm$^2$) | 150 |
| Cold embrittlement temperature (°C.) | −60 |
| JIS Hardness (A) | 97 |

The testing methods for measuring the physical characteristics were identical with those described in Example 1.

TABLE 7

| Test item | | Result obtained |
|---|---|---|
| Front impact | 55° C. | O |
| | Ordinary temperature | O |
| | −30° C. | O |
| Corner impact | 55° C. | O |
| | Ordinary temperature | O |
| | −30° C. | O |
| High temperature oscilation test | | O |
| Heat cycle test | | O |
| Water immersion test | | O |
| Salt spray test | | O |
| Accelerated weather-resistance test | | O |
| Abrasion test | | O |

*Circle (O) means passing the test.

It is understood that the preceding representative examples may be varied within the scope of the present specification, both as to the components and conditions, by one skilled in the art to achieve essentially the same results.

As many apparently widely different embodiments of the present invention may be made without departing from the spirit and scope thereof, it is to be understood that the present invention is not limited to the specific embodiments thereof except as defined in the appended claims.

What is claimed is:

1. An elastic metallized decorative molding comprising a modified polyurethane resin as a substrate having coated on the surface thereof a metallized layer, said polyurethane resin comprising 50–95 parts by weight of a thermoplastic polyurethane resin comprising the reaction product of (a) a poly(pentamethylenecarbonyloxy) glycol having an average molecular weight of about 1800–2200 or (a') a polytetramethylene adipate glycol, (b) tetramethylene glycol in an amount of 2.5–4.5 mols per mol of the glycol (a) or (a'), and (c) diphenylemethane-4,4'-diisocyanate in a molar amount corresponding to the total mols of the glycols (a) or (a') and (b), incorporated with 5–50 parts by weight of an acrylonitrile-butadiene-styrene resin comprised of at least 75% by weight of an acrylonitrile-styrene component and not more than 25% by weight of a butadiene component.

2. Elastic metallized decorative moldings according to claim 1 wherein the acrylonitrile-butadiene-styrene resin is composed of 10–30% by weight of acrylonitrile, 45–90% by weight of styrene and 0–25% by weight of butadiene.

3. Elastic metallized decorative moldings according to claim 1 wherein the substrate is molded by extrusion.

4. Elastic metallized decorative moldings according to claim 1 wherein the metallized layer is applied by means of vacuum deposition.

5. Elastic metallized decorative moldings according to claim 1 wherein the metallized layer is applied by means of spattering.

6. Elastic metallized decorative moldings according to claim 1 wherein the metallized layer is applied in the form of a multi-layer film containing a metallized film.

7. Elastic metallized decorative moldings according to claim 1 wherein the metallized layer is applied in the form of a metallic paint.

8. Elastic metallized decorative moldings according to claim 1 wherein the metallized layer has a protective top coat.

9. Elastic metallized decorative moldings according to claim 1 wherein the substrate is molded by extrusion into a bumper molding for motor vehicles.

10. Elastic decorative moldings according to claim 1 wherein said metallized layer has a thickness of about 250 angstroms.

11. The elastic metallized decorative molding of claim 1 wherein said metallized layer comprises a multi-layer film containing a metallized film.

12. The elastic metallized decorative molding of claim 11 wherein said multi-layer film comprises a vinyl resin undercoat, a metallic intermediate coat and a protective top coat.

13. The elastic metallized decorative molding of claim 12 wherein said protective top coat is selected from at least one member of the group consisting of polyvinyl fluoride or polyvinyl chloride.

14. The elastic metallized decorative molding of claim 1 wherein said metallized layer further includes a protective overcoating.

15. The elastic metallized decorative molding of claim 14 wherein said protective overcoating comprises polyvinyl fluoride.

16. A bumper molding for a motor vehicle which comprises a modified polyurethane resin substrate in the form of a bumper molding having coated on at least one surface thereof a metallized layer, said polyurethane resin comprising 50–95 parts of a thermoplastic polyurethane resin comprising the reaction product of (a) a poly(pentamethylene-carbonyloxy) glycol having an average molecular weight of about 1800–2200 or (a′) a polytetramethylene adipate glycol, (b) tetramethylene glycol in an amount of 2.5–4.5 mols per mol of the glycol (a) or (a′) and (c) diphenylemethane-4,4′-diisocyanate in a molar amount corresponding to the total mols of the glycols (a) or (a′) and (b), incorporated with 5–50 parts by weight of an acrylonitrile-butadiene-styrene resin comprised of at least 75% by weight of an acrylonitrile-styrene component and not more than 25% by weight of a butadiene component.

17. The bumper molding of claim 16 wherein said metallized layer further includes a protective coating.

* * * * *

UNITED STATES PATENT AND TRADEMARK OFFICE
CERTIFICATE OF CORRECTION

PATENT NO. : 4,305,981
DATED : December 15, 1981
INVENTOR(S) : R. Muroi et al

It is certified that error appears in the above—identified patent and that said Letters Patent is hereby corrected as shown below:

On the cover sheet "[73] Assignee", change "Toyoda Synthetics Co., Ltd., Aichi, Japan" to -- Toyoda Gosei Kabushiki-Kaisha and Toyota Jidosha Kogyo Kabushiki Kaisha, both of Aichi-ken, Japan. --

Signed and Sealed this

Twentieth Day of July 1982

[SEAL]

Attest:

GERALD J. MOSSINGHOFF

Attesting Officer    Commissioner of Patents and Trademarks